April 14, 1953     W. D. DRUMMOND     2,634,662
POWER-LIFT FOR AGRICULTURAL IMPLEMENTS
Filed Dec. 4, 1948

INVENTOR.
William D. Drummond
BY Paul O. Pippel
Atty.

Patented Apr. 14, 1953

2,634,662

UNITED STATES PATENT OFFICE 2,634,662

POWER-LIFT FOR AGRICULTURAL IMPLEMENTS

William D. Drummond, Hamilton, Ontario, Canada, assignor, by mesne assignments, to International Harvester Company, Chicago, Ill., a corporation of New Jersey Application December 4, 1948, Serial No. 63,547

5 Claims. (Cl. 97—50)

This invention relates to agricultural implements and particularly to power lift mechanism therefor. More specifically the invention concerns a remote control ram unit attaching structure for a trail-behind implement.

In mounting remotely controlled power cylinders upon implements adapted to be drawn by tractors, problems have arisen in regard to securing accurate depth control and in regard to the removal of the cylinder or ram unit from the implement for use on other implements. The present invention is described in connection with an implement of the field cultivator type, and an object of the invention is to provide an improved mounting for a power cylinder mounted upon the implement and deriving power from a tractor by which it is drawn in trailing relation.

Another object of the invention is to provide in a mounting for a power cylinder upon a trailing implement to raise and lower the earth-working tools, improved means for holding the tools in a raised position upon removal of the cylinder.

Another object of the invention is to provide in a ram unit mounted upon a trail-behind implement, means facilitating the attachment and detachment of the ram unit.

Other objects and advantages of the invention will become clear from the following detailed description when read in conjunction with the accompanying drawings, wherein.

Figure 1:
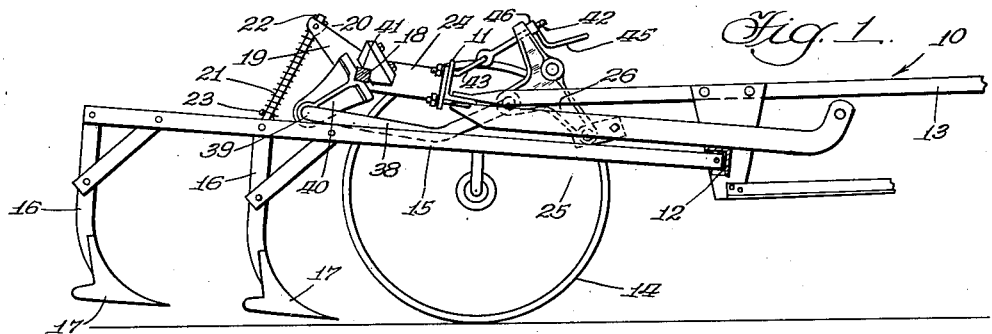
Fig. 1 is a view in side elevation, partly in section, of a field cultivator embodying the features of the present invention.

Referring to the drawings, the numeral 10 designates the frame and hitch construction of a field cultivator of conventional construction. Only a portion of the implement is shown but it may be understood that the implement is of the type illustrated, for example, in United States Patent 2,286,312.

The field cultivator with which the present invention is concerned is adapted to be propelled across a field by a tractor or similar vehicle and comprises a frame structure including transversely extending angle bars 11 and 12 and a triangularly shaped hitch structure 13 adapted for connection to a tractor draw-bar or other source of propelling power. The implement frame is mounted upon ground engaging wheels 14, only one of which is shown, provided at each end of the frame and functioning to support the implement in transport and during operation thereof.

Pivotally mounted upon the forward angle bar 12 of the frame is a longitudinally extending drag link or tool bar 15 which extends rearwardly of the implement frame and has secured thereto a plurality of standards 16 upon which are mounted earth-working shovels 17. It may be understood that a number of drag links 15, each provided suitably with earth-working tools, are mounted at spaced locations upon the frame transversely thereof. Due to the pivotal connection of the front end of drag link 15 to the frame, it should be clear that the earth-working tools may be vertically moved with respect to the frame between operating and transport positions, the latter position being indicated in Fig. 1.

Raising and lowering of the earth-working tools is accomplished by lift mechanism including a transversely extending rock-shaft 18, square in cross-section, and having secured thereto a lift arm 19 provided at its end with a swivel 20 apertured to receive for sliding movement a rod 21 connected at its lower end to the tool bar 15 and provided at its upper end with a cotter key 22 to prevent displacement of the rod from the swivel. Between the swivel 20 and the connection of rod 21 to the tool bar 15, a spring is provided which abuts the swivel at its upper end and a cotter 23 at its lower end. Rotation of rock-shaft 18 and lift arm 19 in a clockwise direction, as viewed in Fig. 1, will, of course, raise the tools to a transport position, whereas rocking of the rock-shaft in the opposite direction will lower the tools to their operating position. A lifting assembly such as that described is provided for each drag link or tool bar 15 comprising the implement.

Rock-shaft 18 is parallel to the angle bars 11 and 12 and is journaled for rotation in one or more brackets 24 affixed to and extending rearwardly from the angle bar 11.

Figure 2:
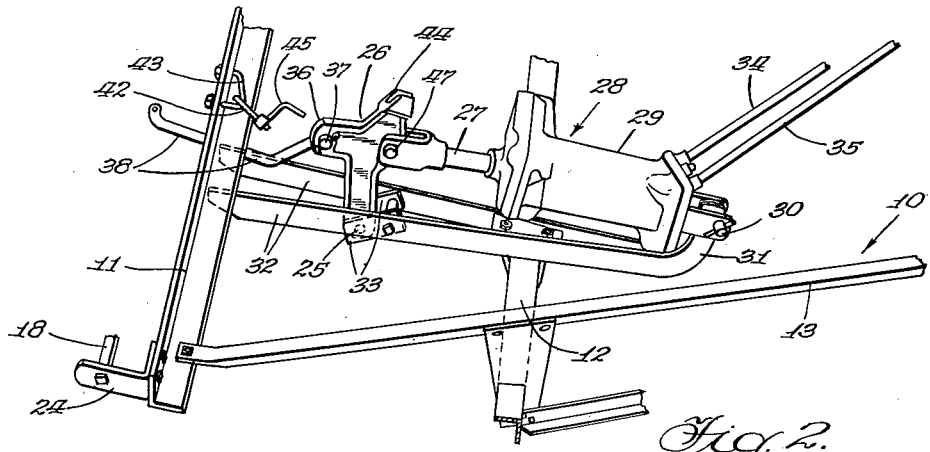
Fig. 2 is a view in perspective with parts removed for clarity showing a portion of the field cultivator with a ram unit in position thereupon.
Figure 3:
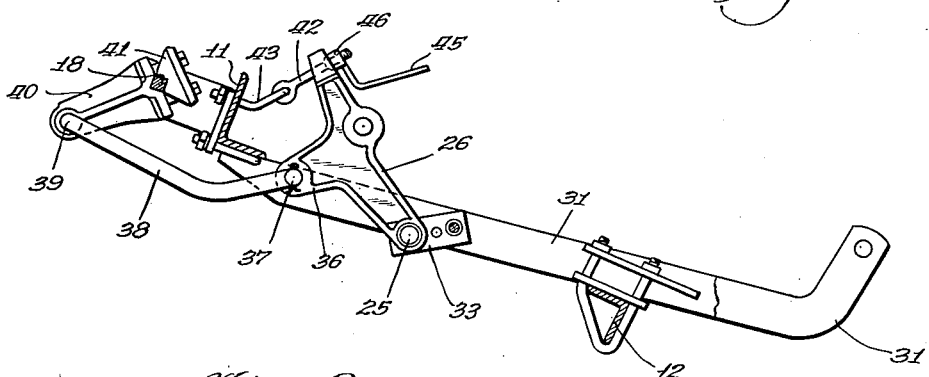
Fig. 3 is a detail showing the relationship of parts with the ram unit removed.

Pivotally mounted at 25 upon the implement frame is one end of a lever 26. As shown in Fig. 2, lever 26 has pivotally connected thereto medially of its ends the piston 27 of a hydraulic ram unit 28. Piston 27 is slidable in a cylinder 29, the other end of which is anchored by a pin 30 to one end of a bracket 31 comprising a pair of longitudinally extending laterally spaced members 32 secured to frame bar 11. Members 32 have mounted therebetween a pair of lugs 33 which provide the pivotal mounting 25 for lever 26.

Fluid under pressure for operation of the ram unit 28 is supplied through flexible hose 34 and 35 from a source of supply, not shown, upon the tractor or other vehicle by which the implement is drawn.

Intermediate the ends of lever 26 there is provided a projection 36 which extends rearwardly from the lever and is apertured to provide a pivotal connection 37 for the forward end of a thrust rod or connecting member 38, the rear end of which is pivotally connected at 39 to a rock arm 40 secured by a clamp 41 to the transversely extending rock-shaft 18.

It should be clear at this point that upon extension of the piston rod 27 with respect to the cylinder 29, lever 26 will, as viewed in Fig. 1, be rocked in a counter-clockwise direction and will transmit motion through thrust rod 38 to move rock arm 40 and shaft 18 in a clockwise direction thus raising the tools to their transport position. Upon movement of the lever 26 to a position corresponding to the transport position of the implement, it will be noted that the pivot point 37, which is the connection of the thrust rod 38 to the projection 36 of the lever, approaches a position which is approximately in alinement with the points of pivot 25 and 39, these points of pivot being respectively the pivot of the lever upon the frame and of the thrust rod upon the rock arm 40. In this position the lever 26 may be locked in position with respect to the frame to hold the earth-working tools in transport so that the ram unit 28 may, if desired, be removed for the purpose of storing the implement or of utilizing the ram unit upon another implement.

The mechanism by which the implements are held in transport upon removal of the ram unit is a latching mechanism including an eye bolt 42 secured to a U-bolt 43 affixed to the frame bar 11. Eye bolt 42 is provided with a pivotal connection to the U-bolt 43 and is swingable from a position such as shown in Fig. 2 into a slot 44 in the upper end of lever 26. Eye bolt 42 is threaded at its end for the reception of a threaded crank 45 having a head 46 which abuts the lever and prevents clockwise movement thereof with respect to the frame. Due to the threaded connection of the crank with the eye bolt 42, it is clear that slight adjustments may be made between the lever and the implement frame. This adjustment is provided to facilitate removal of the ram unit and its replacement upon the implement.

In removing the ram unit from the implement it is necessary that the tension upon the pin 47 by which piston 27 is connected to the lever be relieved in order that the pin 47 may be withdrawn. This adjustment is provided by the bolt 42 and crank 45. The same adjustment is frequently necessary upon replacement of the cylinder upon the implement in order to aline the apertures in the lever and the piston to receive the pin 47 or to aline the apertures in bracket 31 and the cylinder to receive the pin 30.

This adjustment of the lever 26 is greatly facilitated by the fact that the pivot points 25, 37, and 39 are approximately in alinement, the position of pivot point 37 providing a very high mechanical advantage for manipulation of the crank 45 and thus greatly simplifying the work of the machine operator in removing and replacing the ram unit.

It is believed that the operation of the lifting structure of the present invention will be clearly understood from the foregoing description. It may likewise be understood that modifications may be made in the invention without departing from the spirit thereof or the scope of the appended claims.

What is claimed is:

1. Mechanism for mounting a ram unit upon an implement having a frame and a relatively movable part comprising a stationary member mounted on the frame, means pivotally securing one end of said unit to said stationary member, a lever fulcrumed at one end on the frame, a connection between said movable part and said lever medially of its ends and a connection between the other end of the ram unit and said lever medially of its ends for transmitting power from the ram unit to move the movable part, and means for holding said movable part against movement with respect to the frame upon removal of the ram unit comprising a releasable latch connectable between the frame and the end of the lever remote from its fulcrum, said latch means being adjustable in length to independently adjust the position of the lever and the movable part to facilitate removal and replacement of the cylinder.

2. Mechanism for mounting a ram unit upon an implement having a frame, earth-working tools and a part movable to raise and lower the tools comprising means pivotally securing one end of said unit to the frame, a lever fulcrumed at one end on the frame, a member pivotally connected to the movable part and to said lever at a location medially of its ends for transmitting motion from the lever to move the movable part, the points of pivotal connection of the lever to the frame and of the member to the lever and the movable part being approximately in alinement when the tools are in raised position, means pivotally connecting the other end of the ram unit to said lever for operation thereof to raise and lower the tools, and a releasable connection adjustable in length operable to connect the frame to the end of the lever opposite its fulcrum when the tools are in raised position and to hold them in that position upon removal of the ram unit, said connection including a slot formed in the end of the lever and a threaded bolt and nut assembly pivoted on the frame and swingable to and from a position with the bolt received in said slot.

3. Mechanism for mounting a ram unit upon an implement having a frame and earth-working tools movable relative thereto between raised and lowered positions comprising means pivotally securing one end of the ram unit to the frame, a lever fulcrumed on the frame, a thrust member pivotally connected to the earth-working tools and to said lever for transmitting motion from the lever to the tools to raise and lower the latter, the points of pivotal connection of the lever to the frame and of the thrust member to the lever and to the tools being approximately in alinement when the tools are in raised position, means pivotally connecting the other end of the ram unit to said lever for operation thereof to raise and lower the tools, and a releasable latch operable to connect the lever to the frame when the tools are in raised position and to hold them in that position upon removal of the ram unit from the implement, said latch being adjustable in length to adjust the position of the tools and facilitate removal and replacement of the ram unit.

4. In an agricultural implement having a transverse wheeled frame, earth-working tools connected thereto for relative movement between raised and lowered positions and a transverse rock-shaft parallel to the frame connected to the tools and rockable to raise and lower the latter, a power lift structure therefor comprising a ram unit having one end thereof pivotally secured to the frame, a lever fulcrumed at one end on the frame, means operatively connecting the ram unit to the lever medially of its ends for rocking the latter, an arm on said rock-shaft having a connecting point thereon, a projection on the lever extending at a right angle therefrom in the direction of a line drawn between the pivot of the lever on the frame and the connecting point on the rock-shaft arm, and a thrust member connecting said projection to the rock-shaft arm to transmit movement of the ram to the rock-shaft to raise the tools, the connecting point of the thrust member to said projection approaching a position on a line with the points of connection of the lever to the frame and of the member to the rock-shaft arm upon moving the tools to raised position.

5. In an agricultural implement having a transverse wheeled frame, earth-working tools connected thereto for relative movement between raised and lowered positions and a transverse rock-shaft parallel to the frame connected to the tools and rockable to raise and lower the latter, a power lift structure therefor comprising a ram unit having one end thereof pivotally secured to the frame, a lever fulcrumed at one end on the frame, means operatively connecting the ram unit to the lever medially of its ends for rocking the latter, an arm on said rock-shaft having a connecting point thereon, a projection on the lever extending at a right angle therefrom in the direction of a line drawn between the pivot of the lever on the frame and the connecting point on the rock-shaft arm, a thrust member connecting said projection to the rock-shaft arm to transmit movement of the ram to the rock-shaft to raise the tools, the connecting point of the thrust member to said projection approaching a position on a line with the points of connection of the lever to the frame and of the member to the rock-shaft arm upon moving the tools to raised position, and a releasable latch connectable between the frame and the other end of said lever when the tools are in raised position to maintain them in that position upon removal of the ram unit, said latch being adjustable to move the lever relative to the frame independently of the ram unit.

WILLIAM D. DRUMMOND.

References Cited in the file of this patent

UNITED STATES PATENTS

| Number | Name | Date |
|---|---|---|
| 1,113,431 | Groupe | Oct. 13, 1914 |
| 2,309,203 | Morkoski | Jan. 26, 1943 |
| 2,344,123 | Brown et al. | Mar. 14, 1944 |
| 2,358,298 | Benjamin | Sept. 19, 1944 |
| 2,481,017 | Johnson | Sept. 6, 1949 |
| 2,532,577 | Silver et al. | Dec. 5, 1950 |